United States Patent
Henry

(10) Patent No.: US 7,885,526 B2
(45) Date of Patent: Feb. 8, 2011

(54) GREY CARD FOR CONTROLLING EXPOSURE AND WHITE BALANCE OF A DIGITAL CAMERA

(75) Inventor: Sean Henry, Ibstock (GB)

(73) Assignee: Lastolite Limited, Coalville, Leicestershire (GB)

( * ) Notice: Subject to any disclaimer, the term of this patent is extended or adjusted under 35 U.S.C. 154(b) by 700 days.

(21) Appl. No.: 11/632,990

(22) PCT Filed: Aug. 5, 2005

(86) PCT No.: PCT/GB2005/003087

§ 371 (c)(1),
(2), (4) Date: Jan. 19, 2007

(87) PCT Pub. No.: WO2006/013383

PCT Pub. Date: Feb. 9, 2006

(65) Prior Publication Data

US 2007/0189756 A1    Aug. 16, 2007

(30) Foreign Application Priority Data

Aug. 5, 2004 (GB) .................. 0417427.2
Apr. 29, 2005 (GB) .................. 0508721.8

(51) Int. Cl.
*G03B 13/18* (2006.01)
(52) U.S. Cl. ........................ 396/89; 348/188
(58) Field of Classification Search .................. 396/213, 396/89; 348/188
See application file for complete search history.

(56) References Cited

U.S. PATENT DOCUMENTS

| 5,014,081 A | * | 5/1991 | Molloy ........................ 396/163 |
| 6,034,721 A | | 3/2000 | Mangeat et al. |
| 6,118,113 A | * | 9/2000 | Hibbard et al. ............. 250/205 |
| 6,292,617 B1 | * | 9/2001 | Neyman ...................... 386/42 |
| 2003/0044174 A1 | * | 3/2003 | Endo ........................... 396/55 |

FOREIGN PATENT DOCUMENTS

| EP | 0766460 A2 | 4/1997 |
| US | 2004/0027456 A1 | 2/2004 |
| WO | 01/22161 A1 | 3/2001 |

OTHER PUBLICATIONS

International Search Report dated Sep. 27, 2005 from corresponding International Application No. PCT/GB2005/003087.
British Search Report dated Jul. 28, 2005 from the corresponding British Application No. GB0508721.8.
4960 Graukeil A5 18 stufig (2 pages) Online XP002346931 Retrieved from the Internet: URL:http://www.fotowand.com/cv.htm?/gerfr.htm#4690.htm; Retrieved on Sep. 27, 2005.

* cited by examiner

*Primary Examiner*—William B. Perkey
*Assistant Examiner*—Fang-Chi Chang
(74) *Attorney, Agent, or Firm*—Young Basile

(57) ABSTRACT

A target (10, 20) is disclosed suitable for setting the exposure and white balance of a photographic digital camera. The target (10, 20) comprises a target surface (12) that has a reflectance of 18% for all wavelengths of visible light. The target surface (12) is provided with a feature (16) upon which the camera is able to focus.

21 Claims, 2 Drawing Sheets

GREY CARD FOR CONTROLLING EXPOSURE AND WHITE BALANCE OF A DIGITAL CAMERA

FIELD OF THE INVENTION

This invention relates to setting the exposure and white balance of photographic digital cameras before taking a photograph.

BACKGROUND

The exposure setting of a camera determines the amount of light that enters the camera through the lens when taking a photograph, and is adjusted by changing the shutter speed and/or the aperture size of the camera. Most digital cameras include a Through-The-Lens (TTL) light meter that measures the intensity of the light entering the camera through the lens. The light meter reading can be used either automatically by the microprocessor of the camera, or manually by the photographer, to determine the appropriate exposure setting for the particular lighting conditions before a photograph is taken.

Most digital cameras include an automatic mode in which the exposure is set according to the intensity of light that is detected by the light meter before a photograph is taken. In order to determine the appropriate exposure setting, the camera assumes that the scene being photographed has a total visible light reflectance of 18% (ie the scene reflects 18% of incident visible light). Clearly, however, exposure problems can occur when the scene being photographed has a total visible light reflectance that is significantly different to the assumed value of 18%. For example, a scene including large expanses of snow and sky will cause the camera to set the exposure too low, and hence the resulting photograph will be too dark.

One method of setting the exposure more accurately involves using a so-called "grey card". A grey card has a grey target surface with a visible light reflectance of 18%. In use, the photographer positions the grey card close to the subject being photographed. The photographer then causes the camera to take a reading of the intensity of visible light being reflected by the grey card, and the camera then determines the exposure appropriate for the particular lighting conditions. The photographer is then able to manually adjust the exposure appropriately before taking a photograph.

Most digital cameras also include means for setting white balance. This is because the relative intensities of different wavelengths of visible light received by the camera from a particular subject will depend upon the light source(s) illuminating that subject, and in particular the wavelengths of visible light that are emitted by the light source(s). The white balance setting of a camera is used to alter the colours recorded in the photograph so as to obtain a photograph having a more natural-looking set of colours. Most digital cameras have an automatic mode in which the white balance is set automatically when taking a photograph according to the relative intensities of different wavelengths of visible light that are detected by the camera. In this automatic mode, however, the camera assumes that the scene being photographed reflects the same proportion of each wavelength of visible light falling upon it, and hence that the scene has an overall grey colour.

One method of setting the white balance more accurately involves using a white or grey surface to set the white balance of the camera appropriately for the particular lighting conditions. A white surface is often provided on the rear surface of a grey card for convenience. In use, the white or grey surface is placed close to the subject to be shot, and the photographer causes the camera to set the white balance to an appropriate setting using the white or grey surface as a reference.

Although the use of grey cards and white or grey surfaces to calibrate the exposure and white balance settings of cameras is effective, the process can be time-consuming and confusing for an amateur photographer.

There has now been devised an improved accessory for photographic digital cameras and an improved method of taking a photograph which overcome or substantially mitigate the above-mentioned and/or other disadvantages associated with the prior art.

SUMMARY OF THE INVENTION

According to a first aspect of the invention, there is provided a target for setting the exposure and white balance of a photographic digital camera, the target comprising a target surface that has a reflectance of 18% for all wavelengths of visible light, and the target surface being provided with a feature upon which the camera is able to focus.

According to a further aspect of the invention, there is provided a method of photographing a subject, which method comprises the steps of:

(a) positioning a target according to the invention close to the subject;

(b) causing the camera to focus on the feature of the target surface, and simultaneously setting the exposure and white balance of the camera;

(c) removing the target from the field-of-view of the camera whilst maintaining the focus, exposure, and white balance settings of the camera; and (d) taking a photograph of the subject using said focus, exposure, and white balance settings of the camera.

The target and method according to the invention are advantageous principally because a photographer can automatically set the exposure and white balance of the camera whilst focusing the camera immediately before taking a photograph. The method is simple and quick to complete, and is therefore particularly suitable for amateur photographers.

The photographic digital camera will generally include an image sensor, means for focussing the camera, and means for automatically setting both the exposure and the white balance before a photograph is taken.

Most preferably, the camera is provided with an automatic mode in which the exposure setting is set automatically according to the intensity of light detected by a light meter within the camera, and the white balance is set automatically according to the relative intensities of different wavelengths of visible light that are detected by the camera. In this automatic mode, the camera preferably assumes that the scene being photographed has a reflectance of 18% across the entire visible light spectrum.

Most preferably, the photographic digital camera includes means for automatically focussing on the feature of the target surface. Photographic digital cameras typically focus by moving the lens relative to the image sensor until differences in light intensity between adjacent pixels of the image sensor are maximised. Most cameras focus using a strip of pixels that is typically between 100 and 200 pixels in length, and this strip of pixels is commonly orientated either horizontally or vertically when taking a photograph.

Preferably, the target surface is able to entirely fill the viewfinder of the camera, and the camera is able to focus on the target feature in this arrangement. Most preferably, the target surface is sufficiently large that when the camera is positioned ready to take a photograph of the subject, the target can be positioned in front of the subject so that the target surface entirely fills the viewfinder of the camera without any need to move the camera, and the camera is able to focus on the target feature. This feature is necessary where the camera does not have a spot meter for setting the exposure of the camera. However, if the camera does have a spot meter, it is only necessary for the area covered by the spot meter to be filled by the target surface when setting the exposure of the camera.

The target surface reflects the same proportion, ie 18%, of all wavelengths of visible light falling upon it. Most preferably, the target surface excluding the target feature has a constant reflectance (ie 18% for all wavelengths of visible light) at all points across its entire area, and preferably therefore has a grey tone that corresponds to Zone V in the Ansel Adams Zone System.

The target feature preferably comprises one or more areas of the target surface that have a different reflectance to the remainder of the target surface. Most preferably, the boundaries between the target feature and the remainder of the target surface are sharp so as to facilitate focussing. However, the target feature preferably has a significantly smaller area than the remainder of the target surface so that the overall reflectance properties of the target surface are not altered significantly by the presence of the target feature.

The target feature preferably comprises one or more lines on the target surface. Most preferably, these lines extend in more than one direction. For example, the target feature may include two or more straight lines that are orientated at an angle to one another, and/or a closed line such as a circle. Most preferably, the target feature is white or black in colour.

The target preferably comprises a sheet of flexible material that is held in tension at its periphery, and at least one side of which forms the target surface. The sheet of flexible material is preferably stretchable, and hence is preferably a knitted fabric. Most preferably, the sheet of flexible material is provided with a peripheral tube within which a flexible hoop is accommodated, the hoop serving to tension and slightly stretch the sheet of flexible material. The flexible hoop is most preferably formed of a band of resilient material, ie a flat strip of resilient material. The band is most preferably formed in a metal such as steel.

The target is preferably positioned directly in front of a subject, and preferably as close as possible to the front surface of the subject, so that the focus set using the target is suitable for taking a photograph of the subject.

In the automatic mode, the focus, exposure and white balance are preferably set simultaneously when the photographer partially depresses a shutter-release button of the camera, and the camera preferably takes a photograph when the shutter-release button is depressed fully. Hence, the photographer preferably causes the camera to automatically focus on the feature of the target surface, and simultaneously set the exposure and/or white balance, by partially depressing the shutter-release button of the camera. The photographer preferably then removes the target from the field-of-view of the camera whilst maintaining the shutter-release button in its partially depressed state, and hence maintaining the focus, exposure, and white balance settings of the camera. The photographer preferably then takes a photograph of the subject using said focus, exposure, and white balance settings of the camera by fully depressing the shutter-release button.

BRIEF DESCRIPTION OF THE DRAWINGS

The invention will now be described in greater detail, by way of illustration only, with reference to the accompanying drawings, in which.

DESCRIPTION OF THE EMBODIMENTS

Figure 1:
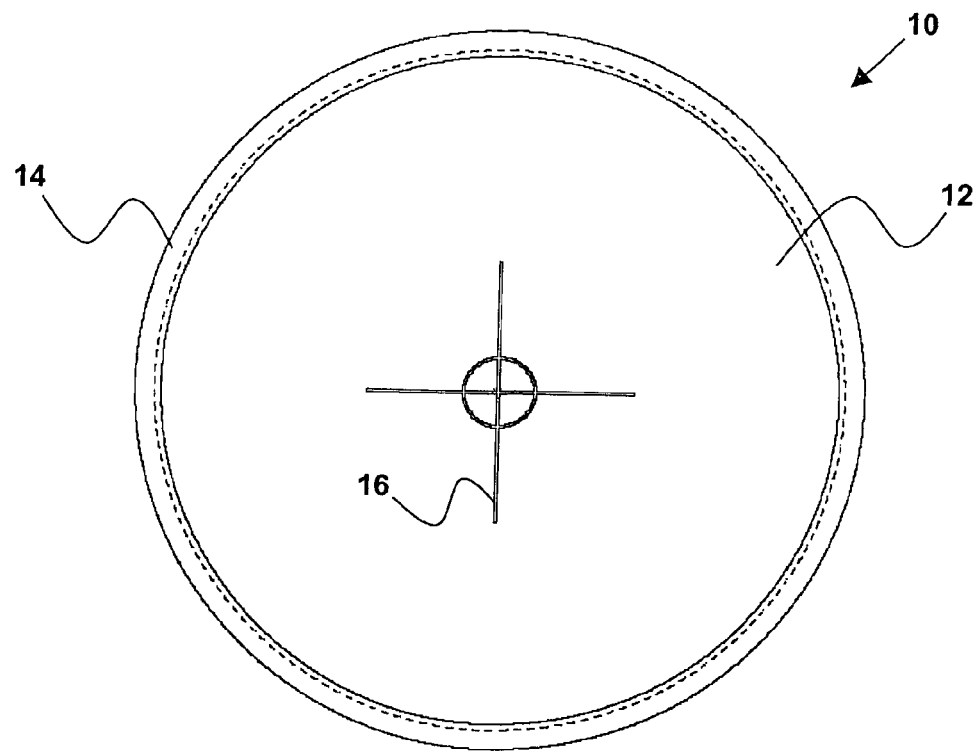
FIG. 1 is a front view of a first embodiment of a target according to the invention.
Figure 2:
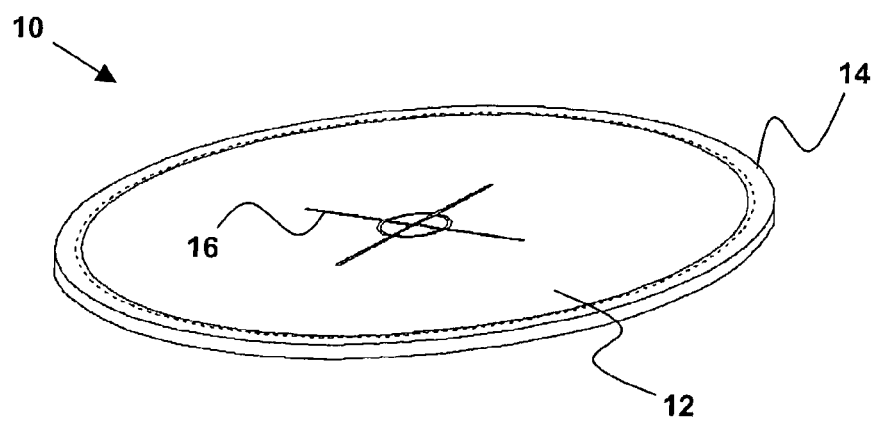
FIG. 2 is a perspective view of the target of FIG. 1.

FIGS. 1 and 2 show a first embodiment of a target according to the invention, which is generally designated 10. The target 10 comprises a circular sheet of fabric that is stretchable and has a target surface 12 formed on one side. The target surface 12 is grey in colour and has a reflectance of 18% for all wavelengths of visible light. The target surface 12 therefore has a neutral reflectance, ie it reflects the same proportion of all wavelengths of visible light falling upon it, and represents the middle tone (Zone V in the Ansel Adams Zone System) used for exposure determination.

The target surface 12 is formed with a target feature 16 at its centre. The target feature 16 is formed from narrow white lines that do not significantly alter the overall reflectance properties of the target surface 12. The target feature 16 comprises a pair of straight lines that intersect one another at their centres, and are orientated perpendicularly to one another. The target feature 16 further comprises a circular line that is centred about the intersection of the two straight lines. A fabric tube 14 is stitched to the periphery of the sheet of fabric and contains a continuous, resilient hoop. The hoop is typically formed from a band of carbon spring steel with a width of about 10 mm and the ends of which are riveted, welded or clipped together to form the hoop. The effect of the hoop is to maintain the sheet of fabric in a tensioned and slightly stretched state, as shown in FIGS. 1 and 2.

The target 10 shown in FIGS. 1 and 2 is of particular use when taking a photograph of a small subject. In use, the photographer firstly arranges the subject, the background, the lighting, and the position of the camera, as desired. The photographer then positions the target 10 directly in front of the subject, and as close as possible to the front surface of subject, so that the viewfinder of the camera is filled with the target surface 12 and the camera is able to automatically focus on the target feature 16.

The photographer then causes the camera to automatically focus on the target feature 16. For most digital cameras, this is done by depressing the shutter release button about halfway, and will also result in the exposure and white balance settings of the camera being set automatically. Provided that the shutter release button is maintained in its partially depressed state, most digital cameras will lock the focus, exposure and white balance settings ready for when the photograph is taken. The photographer therefore removes the target 10 from in front of the subject while maintaining the shutter release button in its partially depressed state, and then fully depresses the shutter release button so as to take a photograph of the subject using the focus, exposure and white balance settings that were set using the target 10.

Clearly, this method of setting the exposure and white balance settings of the camera, whilst simultaneously focussing the camera, is quick and easy, and therefore ideally suited to the amateur photographer.

After use, the target 10 may be collapsed for storage. This is done by grasping opposite sides of the target 10, twisting the target 10 to form two loops, and folding the two loops together to form a collapsed configuration. The collapsed target 10 can then be stowed in a pouch or other receptacle until it is next required.

Figure 3:
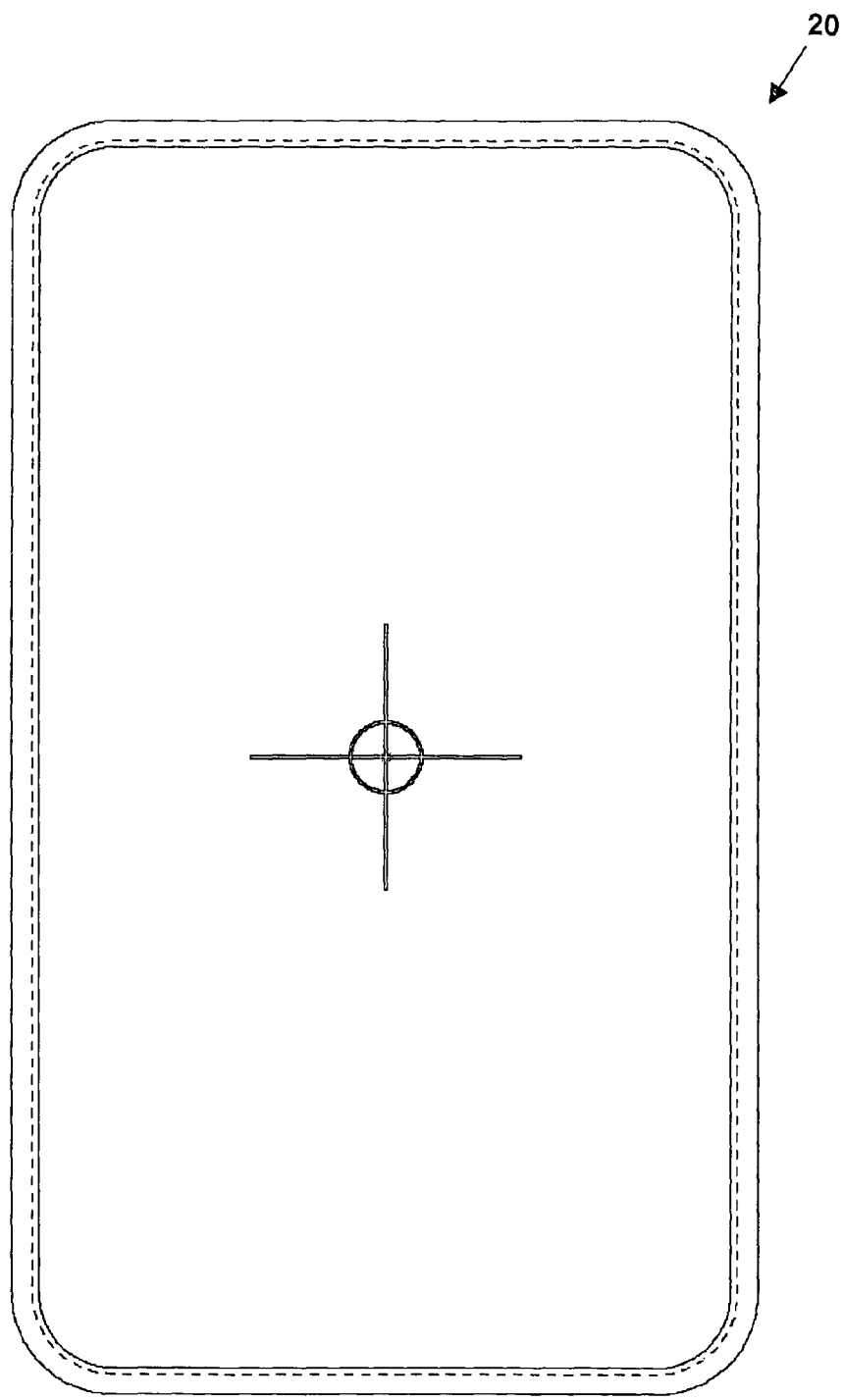
FIG. 3 is a front view of a second embodiment of a target according to the invention.

FIG. 3 shows a second embodiment of a target according to the invention, which is generally designated 20. The target 20 shown in FIG. 3 is identical to the target 10 shown in FIGS. 1 and 2 in all aspects other than size and shape. In particular, the target 20 shown in FIG. 3 is generally rectangular in shape, with rounded corners, and is therefore suitable for more elongate subjects.

The invention claimed is:

1. A target for setting the exposure and white balance of a photographic digital camera, the target comprising a target surface that has a reflectance of 18% for all wavelengths of visible light, and the target surface being provided with a target feature upon which the camera is able to focus while the target surface entirely fills a viewfinder of the camera.

2. A target as claimed in claim 1, wherein the target feature comprises one or more areas of the target surface that have a difference reflectance to the remainder of the target surface.

3. A target as claimed in claim 1, wherein the boundaries between the target feature and the remainder of the target surface are sharp so as to facilitate focusing.

4. A target as claimed in claim 1, wherein the target feature has a significantly smaller area than the remainder of the target surface so that the reflectance properties of the target surface are not altered significantly by the present of the target feature.

5. A target as claimed in claim 1, wherein the target feature comprises one or more lines on the target surface.

6. A target as claimed in claim 5, wherein the lines on the target surface extend in more than one direction.

7. A target as claimed in claim 6, wherein the target feature includes two or more straight lines that are orientated at an angle to one another.

8. A target as claimed in claim 6, wherein the target feature includes a closed line.

9. A target as claimed in claim 1, wherein the target feature is white or black in colour.

10. A target as claimed in claim 1, wherein the target comprises a sheet of flexible material that is held in tension at its periphery, and at least one side of which forms the target surface.

11. The target as claimed in claim 1, wherein the target is adapted to simultaneously set the exposure and the white balance.

12. A method of photographing a subject, which method comprises the steps of:
   (a) positioning a target close to the subject, the target comprising a target surface that has a reflectance of 18% for all wavelengths of visible light, and the target surface being provided with a target feature upon which the camera is able to focus;
   (b) causing the camera to focus on the target feature of the target surface, and simultaneously setting the exposure and white balance of the camera;
   (c) removing the target from the field-of-view of the camera whilst maintaining the focus, exposure, and white balance settings of the camera; and
   (d) taking a photograph of the subject using said focus, exposure, and white balance settings of the camera.

13. A method as claimed in claim 12, wherein, the photographic digital camera includes an image sensor, means for focusing the camera, and means for automatically setting both the exposure and the white balance before a photograph is taken.

14. A method as claimed in claim 13, wherein the camera is provided with an automatic mode in which the exposure setting is set automatically according to the intensity of light detected by a light meter within the camera, and the white balance is set automatically according to the relative intensities of different wavelengths of visible light that are detected by the camera.

15. A method as claimed in claim 14, wherein the camera assumes that the scene being photographed has a reflectance of 18% across the entire visible light spectrum.

16. A method as claimed in claim 15, wherein the photographic digital camera includes means for automatically focusing on the feature of the target surface.

17. A method as claimed in claim 14, wherein in the automatic mode, the focus, exposure and white balance of the camera are set simultaneously when the photographer partially depresses a shutter-release button of the camera, and the camera takes a photograph when the shutter-release button is depressed fully.

18. A method as claimed in claim 17, wherein the photographer causes the camera to automatically focus on the feature of the target surface, and simultaneously set the exposure and/or white balance, by partially depressing the shutter-release button of the camera, the photographer then removes the target from the field-of-view of the camera whilst maintaining the shutter-release button in its partially depressed state, and hence maintaining the focus, exposure, and white balance settings of the camera, and the photographer then takes a photograph of the subject using said focus, exposure, and white balance settings of the camera by fully depressing the shutter-release button.

19. A method as claimed in claim 12, wherein the target is positioned directly in front of a subject, and as close as possible to the front surface of the subject, so that the focus set using the target is suitable for taking a photograph of the subject.

20. A method as claimed in claim 12, wherein the camera does not have a spot meter for setting the exposure of the camera, and the target surface is sufficiently large that when the camera is positioned ready to take a photograph of the subject, the target can be positioned in front of the subject so that the target surface entirely fills the viewfinder of the camera without any need to move the camera, and the camera is able to focus on the target feature.

21. A method as claimed in claim 12, wherein the camera does have a spot meter, and the target surface is sufficiently large that when the camera is positioned ready to take a photograph of the subject, the target can be positioned in front of the subject so that the target surface entirely fills the area covered by the spot meter without any need to move the camera, and the camera is able to focus on the target feature.

* * * * *